(12) United States Patent
Speidel

(10) Patent No.: US 11,518,061 B2
(45) Date of Patent: Dec. 6, 2022

(54) METHOD AND APPARATUS FOR PRODUCING A BOARD

(71) Applicant: Xylo Technologies AG, Niederteufen (CH)

(72) Inventor: Hannes Speidel, Neftenbach (CH)

(73) Assignee: Xylo Technologies AG, Niederteufen (CH)

(*) Notice: Subject to any disclaimer, the term of this patent is extended or adjusted under 35 U.S.C. 154(b) by 169 days.

(21) Appl. No.: 17/052,266

(22) PCT Filed: May 2, 2018

(86) PCT No.: PCT/EP2018/061142
§ 371 (c)(1),
(2) Date: Nov. 2, 2020

(87) PCT Pub. No.: WO2019/210940
PCT Pub. Date: Nov. 7, 2019

(65) Prior Publication Data
US 2021/0053249 A1 Feb. 25, 2021

(51) Int. Cl.
*B27N 3/00* (2006.01)
*B27N 3/04* (2006.01)
(Continued)

(52) U.S. Cl.
CPC .............. *B27N 3/04* (2013.01); *E04F 15/102* (2013.01); *B27N 3/18* (2013.01); *E04C 2002/004* (2013.01); *E04F 2201/0138* (2013.01)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS 4,082,882 A * 4/1978 Weinstein .............. B62D 29/04
428/537.1
4,655,869 A * 4/1987 Tellman ................. B27M 1/006
144/350
(Continued)

FOREIGN PATENT DOCUMENTS

AU 2014284755 A1 12/2015
CN 1085150 A 4/1994
(Continued)

OTHER PUBLICATIONS

Eurasian Office Action for Eurasian Patent application No. 202092298, dated Sep. 22, 2021, pp. 1-4, The Eurasian Patent Organization Patent Office, 2, M. Cherkassky per., Moscow 109012.
(Continued)

*Primary Examiner* — Chi Q Nguyen
(74) *Attorney, Agent, or Firm* — Crowell & Moring LLP

(57) ABSTRACT

A method of producing a board for production of panels is provided comprising: providing particulate material comprising or consisting of particulate wooden material, producing glued particulate material by applying an adhesive to the particulate material, forming a spreading material mat by homogeneously spreading the glued particulate material onto a conveyor on which the spread glued particulate material is conveyed in a conveying direction, and producing a board by pressing the spreading material mat. A reinforcement material is applied to the spread glued particulate material parallel to the conveying direction during forming the spreading material mat and/or after forming the spreading material mat before any pressing of the spreading material mat such that the spreading material mat has at least one longitudinal reinforcement zone containing the reinforcement material. Boards can be obtained from which
(Continued)

panels can be produced which have reinforced longitudinal and/or transversal edges.

20 Claims, 4 Drawing Sheets

(51) Int. Cl.
*E04F 15/10* (2006.01)
*B27N 3/18* (2006.01)
*E04C 2/00* (2006.01)

(58) Field of Classification Search
CPC .......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; B27N 3/04; B27N 3/18; E04C 2002/004
USPC .. 52/592.1, 592.3, 592.2, 578, 588.1, 309.1, 52/309.3, 741.1, 745, 3, 746.1
See application file for complete search history.

(56) References Cited

U.S. PATENT DOCUMENTS

| | | | | |
|---|---|---|---|---|
| 4,675,066 | A * | 6/1987 | Honda | B32B 21/14 100/324 |
| 5,271,699 | A * | 12/1993 | Barre | B44F 9/02 144/24.1 |
| 5,489,460 | A * | 2/1996 | Clarke | B27N 7/00 428/156 |
| 6,878,230 | B2 * | 4/2005 | Abe | B27M 3/006 156/304.6 |
| 7,255,822 | B2 * | 8/2007 | Bledsoe | B29C 70/088 264/102 |
| 7,879,173 | B2 * | 2/2011 | Hattori | B32B 37/10 156/196 |
| 8,221,874 | B1 * | 7/2012 | Zhao | B44C 5/0423 428/326 |
| 8,409,389 | B2 * | 4/2013 | Jones | B29C 70/76 425/111 |
| 8,435,022 | B2 | 5/2013 | Burckhardt et al. | |
| 8,480,831 | B2 * | 7/2013 | Fyie | B32B 21/14 156/182 |
| 9,969,101 | B2 | 5/2018 | Kalwa et al. | |
| 2008/0149262 | A1 * | 6/2008 | Hattori | B32B 38/1808 156/60 |
| 2011/0220271 | A1 * | 9/2011 | Fyie | B32B 7/022 156/60 |
| 2015/0017461 | A1 | 1/2015 | Lindgren et al. | |
| 2021/0170627 | A1 | 6/2021 | Speidel | |

FOREIGN PATENT DOCUMENTS

| | | |
|---|---|---|
| CN | 1449467 A | 10/2003 |
| CN | 1655926 A | 8/2005 |
| CN | 101229650 A | 7/2008 |
| CN | 101827691 A | 9/2010 |
| CN | 102802895 A | 11/2012 |
| CN | 102821921 A | 12/2012 |
| CN | 104520080 A | 4/2015 |
| CN | 104797406 A | 7/2015 |
| CN | 107580538 A | 1/2018 |
| CN | 107671978 A | 2/2018 |
| DE | 10 2010 002 066 A1 | 8/2011 |
| EP | 2 241 426 A1 | 10/2010 |
| EP | 2 146 024 B1 | 2/2013 |
| EP | 2 147 762 B1 | 10/2013 |
| EP | 2 789 438 A1 | 10/2014 |
| EP | 2 125 312 B1 | 3/2015 |
| EP | 2 397 291 B1 | 9/2016 |
| EP | 2 628 580 B1 | 4/2017 |
| EP | 3 184 272 A2 | 6/2017 |
| WO | WO2011101152 A1 | 8/2011 |
| WO | WO 2015/002599 | 1/2015 |
| WO | WO 2015/169647 A1 | 11/2015 |

OTHER PUBLICATIONS

Eurasian Office Action for Eurasian Patent application No. 202092299, dated Sep. 21, 2021, pp. 1-4, The Eurasian Patent Organization Patent Office, 2, M. Cherkassky per., Moscow 109012.
Chinese Office Action for Chinese Patent Application No. 201880093041.6, dated Dec. 15, 2021, 30 pages.
Second Office Action with English Translation for Chinese Patent Application No. 201880093041.6 dated May 27, 2022, 26 pages.
International Search Report, issued in International Application No. PCT/EP2018/061142, dated Apr. 29, 2019, pp. 1-5, European Patent Office, Rijswijk, Netherlands.
International Search Report, issued in International Application No. PCT/EP2018/061143, dated Apr. 29, 2019, pp. 1-5, European Patent Office, Rijswijk, Netherlands.
U.S. Non-Provisional U.S. Appl. No. 17/052,274, filed Nov. 2, 2020.
Ukraine Office Action with English Translation for Ukrainian Patent Application No. a 2020 06329 dated Jul. 5, 2022, 12 pages.
Chinese Office Action with English translation, dated Aug. 24, 2022, pp. 1-23, issued in Chinese Patent Application No. 201880093041.6, China National Intellectual Property Administration, Beijing, P.R. China.

* cited by examiner

METHOD AND APPARATUS FOR PRODUCING A BOARD

CROSS-REFERENCE TO RELATED APPLICATIONS

This application is a 371 nationalization of international patent application PCT/EP2018/061142 filed May 2, 2018, the entire contents of which is hereby incorporated by reference.

DETAILED DESCRIPTION

Figure 1:
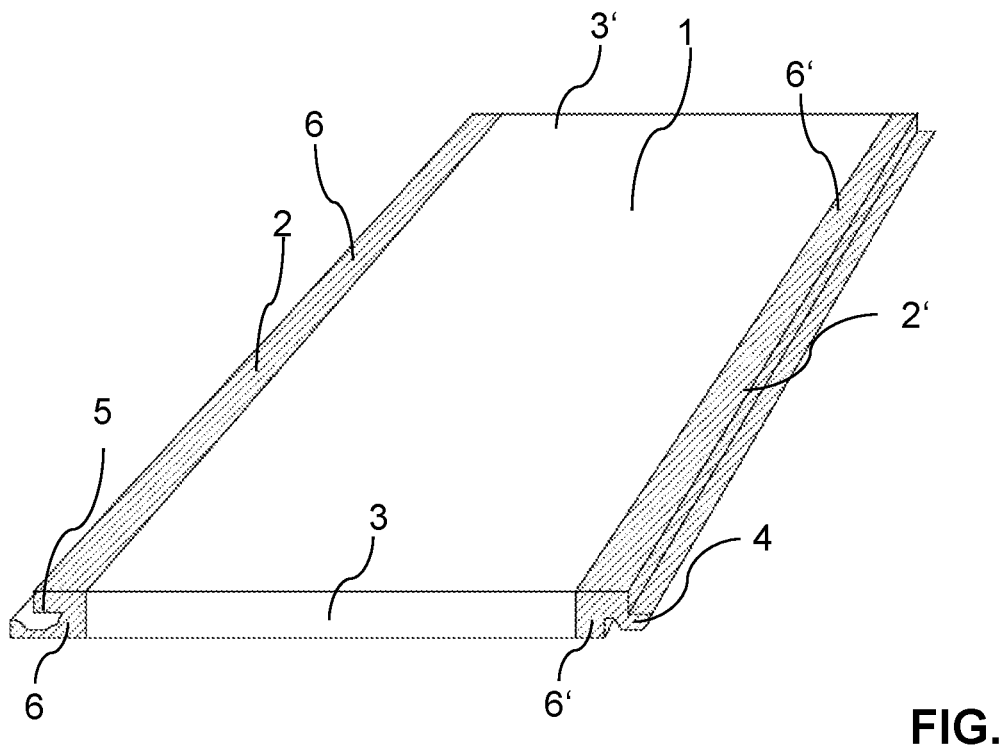
FIG. 1 shows a perspective view of a specific embodiment of a panel 1 according to the present invention.

The present invention relates to a method of producing a board for production of panels. The method comprises the steps of providing particulate material comprising or consisting of particulate wooden material, producing glued particulate material by applying an adhesive to the particulate material, forming a spreading material mat by homogeneously spreading the glued particulate material onto a conveyor on which the spread glued particulate material is conveyed in a conveying direction, and producing a board by pressing the spreading material mat. Furthermore, a reinforcement material is applied to the spread glued particulate material parallel to the conveying direction during forming the spreading material mat and/or after forming the spreading material mat before any pressing of the spreading material mat such that the spreading material mat has at least one longitudinal reinforcement zone containing the reinforcement material. With the method according to the invention, boards can be obtained from which panels can be produced which have reinforced longitudinal and/or transversal edges. The present invention is also related to an apparatus for producing a board for production of panels, to a board for production of panels, to a method of producing a spreading material mat, to a spreading material mat producible by this method, to a method and an apparatus for producing panels, to a panel producible by such method, and to the use of the panel.

According to the state of the art, panels of wooden material, such as medium- or high-density fibre panels (MDF, HDF), are mainly produced by homogeneously spreading a mat of glued wood fibres onto a conveyor belt in order to obtain a fibre mat, compacting the fibre mat in a continuous press in which the glue or resin is then also cured at elevated temperatures, thereby producing a large or "endless" (MDF/HDF) board. EP 2 125 312 discloses an example of a spreading material plant for the spreading part of this process. The board is then covered with systems of decorative and wear resistant layers, wherein counter draw and sound absorption of insulation layers can also be added to such boards. The boards are subsequently cut to the desired size of panels and then locking profile elements, such as tongues and grooves, are machined, e.g. milled, to the longitudinal (and/or transversal) edges of the panels.

Panels obtained by such production process consist of the same "core" material throughout the panel. However, the milled profile edges need to withstand much higher mechanical loading than the rest of the panel. Thus, such profile- and corner elements at the edges of the panel tend to break off during longtime usage. Furthermore, water (or moisture and humidity) from spills or from wet cleaning tends to accumulate in such profile- and corner elements at the edges of the panel, so swelling may occur there since the water adsorbed into the panel core.

In the state of the art, it is known to improve the material quality of the profiles is to add more (and rather expensive) glue/resin to the entire board. WO 2015/169647 discloses a manufacturing method for a woodcomposite (PVC-) material. EP 2 397 291 teaches to add an expanding and hardening mass to a conventional production process to improve strength and resistance to humidity. EP 2 146 024 discloses flooring panels with sealing and "reinforcement" means.

However, when glue is added to the entire board, a very high amount of glue is needed, which results in the disadvantage that the costs of the production of the boards and panels increase significantly.

Thus, methods have been developed in which a cross-linked substance or a reinforcement means is only applied to an edge region of a wood board (EP 2 147 762 B1, EP 2 628 580 B1). Moreover, in EP 3 184 272 A2, a substance is pressed into partial regions of a pre-compressed wooden fibre cake by using a pressure generator for generating an overpressure. Furthermore, EP 2 241 426 A1 describes a method in which a pre-compressed fibre cake is subjected to a vacuum and simultaneously an impregnation medium is applied to the fibre cake which is distributed in partial regions of the fibre cake as a result of the vacuum.

However, all of these methods have several disadvantages. Firstly, overpressure or vacuum must be used for inserting and distributing the reinforcement substance in the fibre cake. However, such overpressure or vacuum has a bad influence on the distribution of the adhesive in the fibre cake, which may result in a less stability of the produced board. Furthermore, by using overpressure or vacuum, it is not possible to homogenously distribute the reinforcement substance in precisely defined regions of the fibre cake. In other words, it is not possible with these methods of the state of the art to obtain a board with precisely defined reinforced regions in which the reinforcement substance is homogeneously distributed. Furthermore, when overpressure or vacuum is used for inserting and distributing the reinforcement substance in a fibre cake (such as e.g. in EP 3 184 272 A2 or EP 2 241 426 A1), the fibre cake must be pre-compressed in order to avoid damage or destruction of the accumulated fibres caused by overpressure or vacuum. Thus, an additional pre-compression step is necessary that makes the method more complex, cost-intensive and time-consuming. Furthermore, such pre-compressed fibre cake (as well as an already produced board) exhibits only a relatively low porosity. This relatively low porosity hinders the infiltration of the reinforcement substance into the fibre cake (or into the board) and, thus also for this reason, only an inhomogeneous distribution of the reinforcement substance in the partial regions of fibre cake (or the board) is achieved. Since an inhomogeneous distribution of the reinforcement substance results in a low mechanical stability of the reinforced regions of the produced board, the reinforced regions of the boards produced with the known methods only have a low mechanical stability. Thus, also the reinforced edges of panels produced from these boards only have a low mechanical stability.

Starting herefrom, it is the object of the present invention to indicate a cost-effective and time-saving method for the production of a board from which panels with reinforced edges can be produced, wherein these reinforced edges have an increased mechanical stability.

According to the invention, a method of producing a board for production of panels is indicated, the method comprising the following steps:
 a) Providing particulate material comprising or consisting of particulate wooden material,
 b) Producing glued particulate material by applying an adhesive to the particulate material,
 c) Forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector,
 d) Producing a board by pressing the spreading material mat, According to the invention, a reinforcement material is applied to the spread glued particulate material parallel to the conveying direction
 during forming the spreading material mat, and/or
 after forming the spreading material mat and before any pressing (or compressing) of the spreading material mat
such that the spreading material mat has at least one longitudinal reinforcement zone containing the reinforcement material.

The application of the reinforcement material is accomplished by spraying, sputtering and/or injecting the reinforcement material onto and/or into the spread glued particulate material. Thus, an easy, fast and precise application of the reinforcement material is possible. Furthermore, the reinforcement material can be applied while the spread glued particulate material is continuously conveyed on the conveyor.

In step a), particulate material is provided. The particulate material comprises or consists of particulate wooden material. Preferably, the particulate material is particulate wooden material. The particulate material may further comprise components of non-wooden material, such as particulate plastic material. In general, the particulate material and the particulate wooden material can be present in any form. It is also possible to use particulate material and particulate wooden material that is present in various forms. For example, wooden fibres, wooden strands, wooden chips, or mixtures thereof may be used as particulate wooden material.

In step b), an adhesive is applied to the particulate material provided in step a) and, thus, glued particulate material is produced. For example, the adhesive is mixed with the particulate material. In general, any adhesive that is suitable for gluing wooden particulate material can be used. Preferably, the adhesive is wood glue. For example, the adhesive is selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof.

In step c), a spreading material mat is formed by homogeneously spreading the glued particulate material produced in step b) onto a conveyor on which the spread glued particulate material is conveyed in a conveying direction. In this regard, the glued particulate material is spread onto the conveyor over a length of a spreading sector extending in conveying direction such that, in conveying direction, the spread glued particulate material is accumulated to the spreading material mat over the length of the spreading sector. Thus, the spreading material mat is produced by accumulating the glued particulate material. In this context, the spreading sector is a local sector in which the glued particulate material is spread onto the conveyor. The spreading sector has a length that extends in conveying direction and has a width that preferably extends over the whole width of the conveyor.

The glued particulate material may be spread continuously or discontinuously onto the conveyor. Thus, the spread glued particulate material may be accumulated continuously or discontinuously to the spreading material mat over the length of the spreading sector. Preferably, the spread glued particulate material is continuously conveyed in the conveying direction.

The formed spreading material mat has a longitudinal direction and a transversal direction that is perpendicular to the longitudinal direction of the spreading material mat. Furthermore, the longitudinal direction of the spreading material mat is parallel to the conveying direction, while the transversal direction of the spreading material mat is perpendicular to the conveying direction.

The spreading material mat has two longitudinal edges, i.e. two edges that are parallel to the longitudinal direction of the spreading material mat. Due to the spreading process of the glued particulate material, the longitudinal edges of the spreading material mat may be uneven. However, between steps c) and d), the longitudinal edges of the spreading material mat may be subjected to a cutting process resulting in the spreading material mat having two even longitudinal edges.

According to the invention, the longitudinal direction of a body (e.g. a spreading material mat, a board or a panel) is the direction of the long axis of the body while the transversal direction of a body (e.g. a spreading material mat, a board or a panel) is the direction of the short axis of the body. A longitudinal edge of a body is an edge parallel to the longitudinal direction of the body while a transversal edge of a body is an edge parallel to the transversal direction of the body.

In step d), a board is produced by pressing the spreading material mat formed in step c). For example, the pressing may be conducted by using a continuous band press. Preferably, the pressing of the spreading material takes place while the spreading material mat is conveyed on a conveyor, e.g. on the conveyor used in step b). Alternatively, the pressing of the spreading material mat may also take place at a point when the spreading material mat is not conveyed.

According to the invention, the spreading material mat has at least one longitudinal reinforcement zone. In this context, a reinforcement zone is a zone of the spreading material mat in which the reinforcement material is located. The at least one longitudinal reinforcement zone is longitudinal, which means that the at least one longitudinal reinforcement zone is parallel to the longitudinal direction of the spreading material mat. The at least one longitudinal reinforcement zone has two longitudinal edges, i.e. edges being parallel to the longitudinal direction of the spreading material mat. Preferably, the at least one longitudinal reinforcement zone has the form of a line, a stripe, or a bar, in particular a straight line, a straight stripe, or a straight bar.

The longitudinal reinforcement zone may include a longitudinal cutting zone that does not contain the reinforcement material, i.e. a longitudinal cutting zone in which the reinforcement material is not located. When the board is cut in this cutting zone, a simplified cutting of the board is possible while, at the edges of the resulting panels, a reinforcement zone is located.

The longitudinal reinforcement zone is only a zone, i.e. a partial region, of the spreading material mat. In detail, the longitudinal reinforcement zone does not extend over the whole width of the spreading material mat, i.e. the whole extent of the spreading material in its transversal direction. In other words, the extent of the longitudinal reinforcement zone in the transversal direction of the spreading material mat is smaller than the extent of the spreading material mat in its transversal direction. In this context, the width of spreading material mat is the extent of the spreading material mat in its transversal direction.

Preferably, the at least one longitudinal reinforcement zone has a constant width, i.e. has a constant extent in the transversal direction of the spreading material mat.

The at least one longitudinal reinforcement zone is obtained
by applying a reinforcement material to the spread glued particulate material parallel to the conveying direction during forming the spreading material mat, i.e. during step c), and/or
by applying a reinforcement material to the spread glued particulate material parallel to the conveying direction after forming the spreading material mat, i.e. after step c), and before any pressing (or compressing) of the spreading material mat.

Since, thus, the spreading material mat used in step d) exhibits at least one longitudinal reinforcement zone containing the reinforcement material, also the board produced by pressing the spreading material mat in step d) exhibits at least one longitudinal reinforcement zone containing the reinforcement material.

The reinforcement material is applied to the spread glued particulate material, i.e. the reinforcement material is applied before step d), and thus before pressing the spreading material mat to a board. Furthermore, the reinforcement material is applied to the spread glued particulate material
during forming the spreading material mat, and/or
after forming the spreading material mat and before any pressing of the spreading material mat.

In this context, the expression "any pressing" also includes any pre-pressing, any compressing and any pre-compressing. Thus, it is clear that the reinforcement material is applied to the spread glued particulate material before any pressing step, before any pre-pressing step, before any compressing step, and before any pre-compressing step. In other words, the reinforcement material is applied to the non-pre-pressed (or non-pre-compressed) spread glued particulate material.

The at least one reinforcement material is applied to the spread glued particulate material parallel to the conveying direction. In other words, the reinforcement material is applied to at least one predefined zone of the spread glued particulate material wherein this at least one predefined zone is parallel to the conveying direction. Since the at least one reinforcement zone is a zone of the spreading material mat in which the reinforcement material is located, the at least one reinforcement zone corresponds to said at least one predefined zone.

The at least one reinforcement material is applied to the spread glued particulate material while the spread glued particulate material is conveyed on the conveyor.

According to the invention, it is essential that the reinforcement material is applied to the spread glued particulate material
during forming the spreading material mat, and/or
after forming the spreading material mat and before any pressing of the spreading material mat.

Since at these points of the method, i.e. before (any) pressing (i.e. also before any compressing, any pre-pressing, any pre-compressing) of the spreading material mat, the spreading material mat exhibits a high porosity, the reinforcement material can better infiltrate into the spreading material mat and thus is distributed more homogeneously in the reinforcement zones. Due to this homogeneous distribution, the at least one reinforcement zone of the produced board can withstand higher mechanical loading, i.e. the at least one reinforcement zone of the produced board has a higher mechanical stability. Furthermore, panels can be produced from the produced board by cutting the board in its longitudinal direction in the at least one longitudinal reinforcement zone. In this way, panels are obtained that have reinforced edges that can withstand higher mechanical loading, i.e. the reinforced edges have a higher mechanical stability.

Thus, the at least one longitudinal reinforcement zone is preferably a predefined zone in which the produced board should be cut (in its longitudinal direction) in panels in the future such that each of the resulting panels comprises at least one reinforced edge.

Since the reinforcement material is applied to the spread glued particulate material
during forming the spreading material mat, and/or
after forming the spreading material mat and before any pressing of the spreading material mat,
a precise appliance of the reinforcement material is possible, i.e. it is possible to homogeneously distribute the reinforcement material in precisely defined regions of the spread glued particulate material. In other words, it is possible with the method according to the present invention to obtain a board with one or more precisely defined reinforced regions in which the reinforcement substance is homogeneously distributed.

Moreover, using overpressure or vacuum for distributing the already applied reinforcement material is not necessary in the method according to the present invention, which makes this method less complex than known methods of the state of the art. Furthermore, a bad influence of vacuum or overpressure on the distribution of the adhesive in the board and, thus, instabilities of the produced board resulting from such bad influence can be avoided.

Furthermore, in the method according to the present invention, an additional pre-compression step for pre-compressing (or pre-pressing) the spreading material mat is not necessary. Thus, one complete method step compared with the methods known in the state of the art can be saved. Therefore, the method according to the present invention is more cost-effective, more time-saving and less complex.

Since the reinforcement material is not applied over the whole width of the spreading material mat but only within one or more reinforcement zones, only a low amount of reinforcement material is needed and, thus also for this reason, the method according to the invention is more cost-effective than other methods known from the state of the art.

Since the reinforcement material is applied parallel to the conveying direction within one or more longitudinal reinforcement zones, it is possible to easily conduct the appliance of the reinforcement material while the spread glued particulate material is conveyed on the conveyer. Thus, the appliance of the reinforcement material can be easily integrated in a completely continuous process for producing the board. Therefore, also for this reason, the method according to the invention is time-saving.

Following this, the method according to the invention is a cost-effective and time-saving method for the production of a board from which panels with reinforced edges can be produced, wherein these reinforced edges have an increased mechanical stability.

It is particularly preferred that the reinforcement material is applied to the spread glued particulate material parallel to the conveying direction during forming the spreading material mat. Thus, the reinforcement material can be applied directly into the core regions of the later spreading material mat or between single layers of the glued particulate material. In this way, an even better and even more homogeneous distribution of the reinforcement material within the reinforcement zones can be achieved, which results in a higher mechanical stability of the reinforcement zones of the produced board, and thus also higher mechanical stability of the reinforced edges of the panels produced from such board.

A preferred embodiment of the method according to the invention is characterized in that that the reinforcement material is applied to the spread glued particulate material parallel to the conveying direction
  during forming the spreading material mat and/or
  after forming the spreading material mat and before any
    pressing of the spreading material mat
such that the spreading material mat has a plurality of longitudinal reinforcement zones that are preferably arranged equidistant to each other.

The sum of the longitudinal reinforcement zones do not extend over the whole width of the spreading material mat, i.e. the whole extent of the spreading material in its transversal direction. In other words, the sum of the extents of the longitudinal reinforcement zones in the transversal direction of the spreading material mat is smaller than the extent of the spreading material mat in its transversal direction. In this context, the width of spreading material mat is the extent of the spreading material mat in its transversal direction. Since each of the longitudinal reinforcement zones is parallel to the longitudinal direction of the spreading material mat or the board, all longitudinal reinforcement zones are parallel to each other.

Preferably, each of the longitudinal reinforcement zones has a constant width, i.e. has a constant extent in the transversal direction of the spreading material mat.

For example, the reinforcement material is applied to the spread glued particulate material parallel to the conveying direction
  during forming the spreading material mat, and/or
  after forming the spreading material mat and before any
    pressing of the spreading material mat
such that the spreading material mat has three, four or five longitudinal reinforcement zones.

Preferably, the longitudinal reinforcement zones are arranged equidistant to each other. This means that the distance between each pair of longitudinal reinforcement zones lying next to each other is the same. In this context, the distance between a first and a second longitudinal reinforcement zone is the shortest distance between the longitudinal edge of the first longitudinal reinforcement zone lying closest to the second longitudinal reinforcement zone and the longitudinal edge of the second longitudinal reinforcement zone lying closest to the first longitudinal reinforcement zone. In this connection, a longitudinal edge of a longitudinal reinforcement zone is an edge that is parallel to longitudinal direction of the spreading material mat (or the board).

For example, if the spreading material mat or the board exhibits three longitudinal reinforcement zones that are arranged equidistant to each other, wherein the second zone lies between the first zone and the third zone, the distance between the first zone and the second zone would be equal to the distance between the second zone and the third zone, i.e. the distance between the longitudinal edge of the first zone lying closest to the second zone and the longitudinal edge of the second zone lying closest to the first zone would be equal to the distance between the longitudinal edge of the second zone lying closest to the third zone and the longitudinal edge of the third zone lying closest to the second zone.

Furthermore, it is preferred that a first longitudinal reinforcement zone of the plurality of longitudinal reinforcement zones is located directly adjacent to a first longitudinal edge of the spreading material mat, a second longitudinal reinforcement zone of the plurality of longitudinal reinforcement zones is located directly adjacent to a second longitudinal edge of the spreading material mat, and at least one third longitudinal reinforcement zone of the plurality of longitudinal reinforcement zones is located between the first longitudinal reinforcement zone and the second longitudinal reinforcement zone.

It is preferred that the extent of the first longitudinal reinforcement zone in the transversal direction of the spreading material mat is equal to the extent of the second longitudinal reinforcement zone in the transversal direction of the spreading material mat, wherein the extent of the at least one third longitudinal reinforcement zone in the transversal direction of the spreading material mat is twice as large as the extent of the first longitudinal reinforcement zone in the transversal direction of the spreading material mat. In this context, a longitudinal reinforcement zone being located directly adjacent to a longitudinal edge of the spreading material mat means that one longitudinal edge of the longitudinal reinforcement zone and the longitudinal edge of the spreading material mat are at the same position. A longitudinal edge is an edge that is parallel to the longitudinal direction of the spreading material mat (or the board).

For example, the spreading material mat exhibits one first longitudinal reinforcement zone, one second longitudinal reinforcement zone and one, two or three third longitudinal reinforcement zones.

When the board it cut into panels in its longitudinal direction in the longitudinal reinforcement zone, the board may be cut such that the longitudinal reinforcement zones that are not located at the longitudinal edges of the board, i.e. the one or more third longitudinal reinforcement zones, are halved. Of course, the board is not cut in the longitudinal reinforcement zones located at the longitudinal edges of the board, i.e. the first and the second longitudinal reinforcement zone. Since the width of each third longitudinal reinforcement zone is twice as large as the width of the first and the second longitudinal reinforcement zone, it can be achieved that all reinforced edges, i.e. reinforced zones located at the edges, of the panels obtained by cutting the board, have the same extent.

Furthermore, its preferred that the extent of the first longitudinal reinforcement zone in the transversal direction of the spreading material mat is from 3 mm to 70 mm, preferably from 6 mm to 45 mm, more preferably from 10 mm to 25 mm, and/or the extent of the second longitudinal reinforcement zone in the transversal direction of the spreading material mat is from 3 mm to 70 mm, preferably from 6 mm to 45 mm, more preferably from 10 mm to 25 mm, and/or the extent of the at least one third longitudinal reinforcement zone in the transversal direction of the spreading material mat is from 6 mm to 140 mm, preferably from 12 mm to 90 mm, more preferably from 20 mm to 50 mm.

Moreover, it is preferred that the at least one third longitudinal reinforcement zone has two longitudinal (outer) edges that are parallel to the longitudinal direction of the spreading material mat, wherein the at least one third longitudinal reinforcement zone comprises two longitudinal reinforcement subzones containing the reinforcement material and one longitudinal cutting zone that does not contain the reinforcement material and that is located between the two longitudinal reinforcement subzones such that it has the same distance to both longitudinal (outer) edges of the at least one third longitudinal reinforcement zone. In other words, each third longitudinal reinforcement zone comprises two longitudinal reinforcement subzones containing the reinforcement material and one longitudinal cutting zone that does not contain the reinforcement material and that is located between the two longitudinal reinforcement subzones such that the two longitudinal reinforcement subzones have the same width, i.e. the same extent in the transversal direction of the spreading material mat. When the board it cut into panels in its longitudinal direction in the third longitudinal reinforcement zone(s), the board may be cut in the cutting zone(s) of the third longitudinal reinforcement zone(s). In this way, cutting of the board is simplified since the board is cut in a small region that does not contain the reinforcement material, and thus does not have a high mechanical stability, while the edges of the resulting panels are reinforced edges since a reinforcement zone is located at these edges.

Preferably, the longitudinal cutting zone has such a width that the whole cutting zone can be cut away by cutting the board into panels or can be milled away by providing the produced panels with locking profile elements. Preferably, the extent of the longitudinal cutting zone in the transversal direction of the spreading material mat is from 1 mm to 50 mm, more preferably from 5 mm to 30 mm, most preferably from 8 mm to 15 mm.

A further preferred embodiment of the method according to the invention is characterized in that the at least one longitudinal reinforcement has two longitudinal edges that are parallel to the longitudinal direction of the spreading material mat and comprises a longitudinal centre region that is parallel to the longitudinal direction of the spreading material mat, wherein the concentration of the reinforcement material decreases gradually from the longitudinal centre region to one or both of the two longitudinal edges of the at least one reinforcement zone. The longitudinal centre region may have any width that is smaller than the width of its longitudinal reinforcement zone. In this context, the width of the longitudinal centre region is the extent of the longitudinal centre region in the transversal direction of the spreading material mat. Preferably, the extent of the longitudinal centre region in the transversal direction of the spreading material mat is from 5 mm to 140 mm, more preferably from 12 mm to 90 mm, most preferably from 20 mm to 50 mm. According to this preferred embodiment, the longitudinal reinforcement zone comprises a longitudinal centre region, wherein the reinforcement material can be present in a constant (relatively high) concentration over the whole centre region. In the remaining regions of the longitudinal reinforcement zone, the concentration increases from one or both longitudinal edges of the reinforcement zone to the centre region. In this way, a smooth transition from areas without reinforcement material to the centre region of the reinforcement zone having a relatively high concentration of reinforcement material can be obtained. Consequently, an abrupt transition from non-reinforced areas of the produced board to highly reinforced areas of the produced board and thus an abrupt change in mechanical properties is avoided. Since locations of a board (or panels produced from such board) with such abrupt transitions or changes in mechanical properties tend to easily break if they are exposed to mechanical stress, the avoidance of such abrupt transitions is very advantageous with respect to the stability of the produced board or the produced panels.

In the case that the at least one longitudinal reinforcement is at least one third longitudinal reinforcement zone, i.e. a longitudinal reinforcement zone that is not located directly adjacent to a longitudinal edge of the spreading material mat, wherein the at least one third longitudinal reinforcement zone comprises a longitudinal centre region and a longitudinal cutting zone, the longitudinal cutting zone is arranged in that longitudinal centre region of the at least one third longitudinal reinforcement zone. Thus, the longitudinal centre region comprises a longitudinal cutting zone that does not contain the reinforcement material and that is located between two longitudinal reinforcement subzones of the at least one third longitudinal reinforcement zone such that the longitudinal cutting zone has the same distance to both longitudinal edges of the at least one third longitudinal reinforcement zone. In this case, the reinforcement material may be present in a constant (relatively high) concentration over the whole centre region except in the longitudinal cutting zone in which the reinforcement material is not present. The longitudinal cutting zone has a width that is smaller than the width of the longitudinal centre region. In this context, the width is the extent in the transversal direction of the spreading material mat. As already explained above, the presence of the longitudinal cutting zone simplifies the cutting of the board into panels since the board can be cut in the longitudinal subzone that does not comprise the reinforcement material.

A further preferred embodiment is characterized in that
- the at least one longitudinal reinforcement zone has a distance from the top surface and/or the bottom surface of the spreading material mat of at least 10 mm, preferably of at least 20 mm, more preferably of at least 40 mm, most preferably of at least 60 mm, or
- the at least one longitudinal reinforcement zone extends substantially over the whole thickness of the spreading material mat.

When the at least one longitudinal reinforcement zone extends substantially over the whole thickness of the spreading material mat, a good and homogeneous distribution of the reinforcement material is achieved. Thus, the mechanical stability of the edges of the panels produced from the board by cutting the board in the longitudinal reinforcement zones is increased. The thickness of the spreading material mat is the extent of the spreading material mat in the direction that is perpendicular to the longitudinal direction of the spreading material mat and that is perpendicular to the transversal direction of the spreading material mat.

In a further preferred embodiment of the method according to the invention the reinforcement material is continuously applied to the spread glued particulate material. Also in this way, a good and homogeneous distribution of the reinforcement material is achieved, which results in a better mechanical stability of the edges of the panels produced from the board by cutting the board along the longitudinal reinforcement zones.

It is particularly preferred that the reinforcement material is applied to the spread glued particulate material parallel to the conveying direction
- by spraying and/or sputtering during forming the spreading material mat, and/or
- by injecting after forming the spreading material mat and before any pressing of the spreading material mat.

Thus, the reinforcement material can be directly applied into the core regions of the spreading material mat or between single layers of the glued particulate material. In this way, an even better and even more homogeneous distribution of the reinforcement material within the reinforcement zones can be achieved, which results in a higher mechanical stability of the reinforcement zones of the produced board, and thus also higher mechanical stability of the reinforced edges of the panels produced from such board.

In a further preferred embodiment, for each longitudinal reinforcement zone, the reinforcement material is applied to the spread glued particulate material by at least one reinforcement material addition means that is located above the conveyor within the spreading sector, wherein the at least one reinforcement material addition means is preferably at least one nozzle and/or at least one injection needle assembly with injection needles. With this preferred embodiment, an easy and precise application of the reinforcement material is possible during forming the spreading material mat. By using injection needles, the reinforcement material can be easily applied over the whole thickness of reinforcement zone also after forming the spreading material mat. Thus, an even more homogeneous distribution of the reinforcement material within the reinforcement zones can be achieved, which results in a higher mechanical stability of the reinforcement zones of the produced board, and thus also higher mechanical stability of the reinforced edges of the panels produced from such board.

It is particularly preferred that the reinforcement material is applied to the spread glued particulate material parallel to the conveying direction
- by at least one nozzle during forming the spreading material mat, and/or
- by at least one injection needle assembly with injection needles after forming the spreading material mat and before any pressing of the spreading material mat.

Furthermore, it is preferred that, for each longitudinal reinforcement zone, the reinforcement material is applied to the spread glued particulate material by a plurality of reinforcement material addition means, preferably by at least three reinforcement material addition means, more preferably by 3 to 10 reinforcement material addition means, that are located above the conveyor within the spreading sector, wherein the reinforcement material addition means are preferably arranged equidistant to each other. With this preferred variant, a better distribution of the reinforcement material over the thickness of the spreading material mat can be achieved, which leads to a higher mechanical stability of the edges of the panels produced from the obtained board by cutting the board in the longitudinal reinforcement zones.

A further preferred embodiment of the method according to the invention is characterized in that, additionally, the reinforcement material is applied to the spread glued particulate material perpendicular to the conveying direction by spraying, sputtering and/or injecting
- during forming the spreading material mat and/or
- after forming the spreading material mat and before any pressing of the spreading material mat such that the spreading material mat additionally has at least one transversal reinforcement zone. Thus, the produced board comprises at least one longitudinal reinforcement zone and at least one transversal reinforcement zone. Consequently, with this preferred embodiment, a board is obtained from which panels with at least one reinforced longitudinal edge and with at least one reinforced transversal edge and also panels with three or four reinforced edges can be produced by cutting the board longitudinally in the at least one longitudinal reinforcement zone and transversally in the at least one transversal reinforcement zone comprising the reinforcement material.

Preferably the application of the reinforcement material to the spread glued particulate material perpendicular to the conveying direction is accomplished in the same manner as the application of the reinforcement material to the spread glued particulate material parallel to the conveying direction.

Preferably, the at least one transversal reinforcement zone extends over the whole width of the spreading material mat and has a limited extent in the longitudinal direction of the spreading material mat.

In a further preferred embodiment, the adhesive and the reinforcement material are the same material, wherein the adhesive and/or the reinforcement material is preferably selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof. By using the same material as adhesive and as reinforcement material, incompatibilities of different materials, which may lead to a decrease of stability, can be avoided. Furthermore, the method is simplified since only one material is used.

Preferably, the reinforcement material is liquid. Furthermore, it is preferred that the reinforcement material is selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof. With these materials, a high mechanical stability of the reinforcement zones of the produced board and thus also of the reinforced edges of the panels produced from such board can be achieved.

Furthermore, it is preferred that the particulate wooden material is selected from the group consisting of wood fibres, wood dust, wood strands, wood chips, and mixtures thereof. It is particularly preferred that the particulate wooden material is wood fibres.

In a further preferred embodiment, the board is cut or sawn at least once in the transversal direction of the board into a plurality of boards.

In this context, it is preferred that each of boards of the plurality of boards is provided with at least one upper layer, wherein the at least one upper layer is preferably selected from the group consisting of primer layers, décor layers, polymer layers, lacquer layers, sound insulation layers, moisture protection layers, wear resistant layers, backing layers, and combinations thereof. For example, the board is provided with a resin soaked paper layer, a décor layer, a layer of resin soaked abrasion-resistant particles, a primer layer, and/or an overlay. The layers may be provided by printing, preferably direct printing.

The present invention also relates to a board for production of panels and producible with a method according to the present invention, the board having a top surface and having a bottom surface, and the board having a longitudinal direction and having a transversal direction perpendicular to the longitudinal direction, wherein the board comprises at least one longitudinal reinforcement zone containing a reinforcement material. From such a board, panels with reinforced edges can be produced while the board itself can be produced cost-effectively since only a low amount of reinforcing material is needed.

According to the invention, the board has at least one longitudinal reinforcement zone. In this context, a reinforcement zone is a zone of the board in which the reinforcement material is located. The at least one longitudinal reinforcement zone is longitudinal, which means that the at least one longitudinal reinforcement zone is parallel to the longitudinal direction of the board. The at least one longitudinal reinforcement zone has two longitudinal edges, i.e. edges being parallel to the longitudinal direction of the board. Preferably, the at least one longitudinal reinforcement zone has the form of a line, a stripe, or a bar, in particular a straight line, a straight stripe, or a straight bar.

The longitudinal reinforcement zone may include a longitudinal cutting zone that does not contain the reinforcement material, i.e. a longitudinal cutting zone in which the reinforcement material is not located. When the board is cut in this cutting zone, a simplified cutting of the board is possible while, at the edges of the resulting panels, a reinforcement zone is located.

The longitudinal reinforcement zone is only a zone, i.e. a partial region, of the board. In detail, the longitudinal reinforcement zone does not extend over the whole width of the board, i.e. the whole extent of the board in its transversal direction. In other words, the extent of the longitudinal reinforcement zone in the transversal direction of the board is smaller than the extent of the board in its transversal direction. In this context, the width of board is the extent of the board in its transversal direction.

Preferably, the at least one longitudinal reinforcement zone has a constant width, i.e. has a constant extent in the transversal direction of the board.

The board according to the invention is producible (or produced) with the method according to the invention, i.e. the method of producing a board for production of panels.

Since the board according to the invention has been produced by the method according to the present invention, the at least one longitudinal reinforcement zone of the board is at least one precisely defined reinforced region in which the reinforcement substance is homogeneously distributed. Due to this homogeneous distribution, the at least one reinforcement zone of the board can withstand higher mechanical loading, i.e. the at least one reinforcement zone of the board has a higher mechanical stability. Thus, the board according to the invention differs from other boards known from the state of the art in that the at least longitudinal reinforcement zone is more precisely defined and in that the reinforcement material is more homogeneously distributed in the at least one longitudinal reinforcement zone. Furthermore, the at least one longitudinal reinforcement zone of the board according to the invention has a higher mechanical stability than the reinforcement zones of boards known from the state of the art. These differences are consequences of the fact that the board according to the invention has been produced with the method according to the invention.

From the board according to the invention, panels can be produced by cutting the board in its longitudinal direction in the at least one longitudinal reinforcement zone. In this way, panels are obtained that have reinforced edges that can withstand higher mechanical loading, i.e. the reinforced edges have a higher mechanical stability.

Thus, the at least one longitudinal reinforcement zone is preferably at least one predefined zone in which the produced board should be cut (in its longitudinal direction) in panels in the future such that each of the resulting panels comprises at least one reinforced edge.

In a further preferred embodiment, the board is an endless board.

A further preferred embodiment of the board according to the invention is characterized in that the board has a plurality of longitudinal reinforcement zones.

The sum of the longitudinal reinforcement zones do not extend over the whole width of the board, i.e. the whole extent of the board in its transversal direction. In other words, the sum of the extents of the longitudinal reinforcement zones in the transversal direction of the board is smaller than the extent of the board in its transversal direction. In this context, the width of board is the extent of the board in its transversal direction. Since each of the longitudinal reinforcement zones is parallel to the longitudinal direction of the board, all longitudinal reinforcement zones are parallel to each other.

Preferably, each of the longitudinal reinforcement zones has a constant width, i.e. has a constant extent in the transversal direction of the board.

For example, the board has three, four or five longitudinal reinforcement zones.

Preferably, the longitudinal reinforcement zones are arranged equidistant to each other. This means that the distance between each pair of longitudinal reinforcement zones lying next to each other is the same. In this context, the distance between a first and a second longitudinal reinforcement zone is the shortest distance between the longitudinal edge of the first longitudinal reinforcement zone lying closest to the second longitudinal reinforcement zone and the longitudinal edge of the second longitudinal reinforcement zone lying closest to the first longitudinal reinforcement zone. In this connection, a longitudinal edge of a longitudinal reinforcement zone is an edge that is parallel to longitudinal direction of the board.

For example, if the board exhibits three longitudinal reinforcement zones that are arranged equidistant to each other, wherein the second zone lies between the first zone and the third zone, the distance between the first zone and the second zone would be equal to the distance between the second zone and the third zone, i.e. the distance between the longitudinal edge of the first zone lying closest to the second zone and the longitudinal edge of the second zone lying closest to the first zone would be equal to the distance between the longitudinal edge of the second zone lying closest to the third zone and the longitudinal edge of the third zone lying closest to the second zone.

Furthermore, it is preferred that a first longitudinal reinforcement zone of the plurality of longitudinal reinforcement zones is located directly adjacent to a first longitudinal edge of the board, a second longitudinal reinforcement zone of the plurality of longitudinal reinforcement zones is located directly adjacent to a second longitudinal edge of the board, and at least one third longitudinal reinforcement zone of the plurality of longitudinal reinforcement zones is located between the first longitudinal reinforcement zone and the second longitudinal reinforcement zone.

It is preferred that the extent of the first longitudinal reinforcement zone in the transversal direction of the board is equal to the extent of the second longitudinal reinforcement zone in the transversal direction of the board, wherein the extent of the at least one third longitudinal reinforcement zone in the transversal direction of the board is twice as large as the extent of the first longitudinal reinforcement zone in the transversal direction of the board. In this context, a longitudinal reinforcement zone being located directly adjacent to a longitudinal edge of the board means that one longitudinal edge of the longitudinal reinforcement zone and the longitudinal edge of the board are at the same position. A longitudinal edge is an edge that is parallel to the longitudinal direction of the board.

For example, the board exhibits one first longitudinal reinforcement zone, one second longitudinal reinforcement zone and one, two or three third longitudinal reinforcement zones.

When the board it cut into panels in its longitudinal direction in the longitudinal reinforcement zone, the board may be cut such that the longitudinal reinforcement zones that are not located at the longitudinal edges of the board, i.e. the one or more third longitudinal reinforcement zones, are each halved. Of course, the board is not cut in the longitudinal reinforcement zones located at the longitudinal edges of the board, i.e. the first and the second longitudinal reinforcement zone. Since the width of each third longitudinal reinforcement zone is twice as large as the width of the first and the second longitudinal reinforcement zone, it can be achieved that all reinforced edges, i.e. reinforced zones located at the edges, of the panels obtained by cutting the board, have the same extent.

Furthermore, its preferred that the extent of the first longitudinal reinforcement zone in the transversal direction of the board is from 3 mm to 70 mm, preferably from 6 mm to 45 mm, more preferably from 10 mm to 25 mm, and/or the extent of the second longitudinal reinforcement zone in the transversal direction of the board is from 3 mm to 70 mm, preferably from 6 mm to 45 mm, more preferably from 10 mm to 25 mm, and/or the extent of the at least one third longitudinal reinforcement zone in the transversal direction of the board is from 6 mm to 140 mm, preferably from 12 mm to 90 mm, more preferably from 20 mm to 50 mm.

Moreover, it is preferred that the at least one third longitudinal reinforcement zone has two longitudinal (outer) edges that are parallel to the longitudinal direction of the board, wherein the at least one third longitudinal reinforcement zone comprises two longitudinal reinforcement subzones containing the reinforcement material and one longitudinal cutting zone that does not contain the reinforcement material and that is located between the two longitudinal reinforcement subzones such that it has the same distance to both longitudinal (outer) edges of the at least one third longitudinal reinforcement zone. In other words, each third longitudinal reinforcement zone comprises two longitudinal reinforcement subzones containing the reinforcement material and one longitudinal cutting zone that does not contain the reinforcement material and that is located between the two longitudinal reinforcement subzones such that the two longitudinal reinforcement subzones have the same width, i.e. the same extent in the transversal direction of the board. When the board it cut into panels in its longitudinal direction in the third longitudinal reinforcement zone(s), the board may be cut in the cutting zone(s) of the third longitudinal reinforcement zone(s). In this way, cutting of the board is simplified since the board is cut in a small region that does not contain the reinforcement material, and thus does not have a high mechanical stability, while the edges of the resulting panels are reinforced edges since a reinforcement zone is located at these edges.

Preferably, the longitudinal cutting zone has such a width that the whole cutting zone can be cut away by cutting the board into panels or can be milled away by providing the produced panels with locking profile elements. Preferably, the extent of the longitudinal cutting zone in the transversal direction of the board is from 1 mm to 50 mm, more preferably from 5 mm to 30 mm, most preferably from 8 mm to 15 mm.

A further preferred embodiment of the board according to the invention is characterized in that the at least one longitudinal reinforcement zone has two longitudinal edges that are parallel to the longitudinal direction of the board and comprises a longitudinal centre region that is parallel to the longitudinal direction of the board, wherein the concentration of the reinforcement material within the at least one reinforcement zone decreases gradually from the longitudinal centre region to one or both of the two longitudinal edges of the at least one reinforcement zone. The longitudinal centre region may have any width that is smaller than the width of its longitudinal reinforcement zone. In this context, the width is the extent in the transversal direction of the board. Preferably, the extent of the longitudinal centre region in the transversal direction of the board is from 6 mm to 140 mm, more preferably from 12 mm to 90 mm, most preferably from 8 mm to 50 mm. According to this preferred embodiment, the longitudinal reinforcement zone comprises a longitudinal centre region, wherein the reinforcement material can be present in a constant (relatively high) concentration over the whole centre region. In the remaining regions of the longitudinal reinforcement zone, the concentration increases from one or both longitudinal edges of the reinforcement zone to the centre region. In this way, a smooth transition from areas without reinforcement material to the centre region of the reinforcement zone having a relatively high concentration of reinforcement material can be obtained. Consequently, an abrupt transition from non-reinforced areas of the board to highly reinforced areas of the board and thus an abrupt change in mechanical properties is avoided. Since locations of the board (or panels produced from the board) with such abrupt transitions or changes in mechanical properties tend to easily break if they are exposed to mechanical stress, the avoidance of such abrupt transitions is very advantageous with respect to the stability of the board or the produced panels.

In the case that the at least one longitudinal reinforcement is at least one third longitudinal reinforcement zone, i.e. a longitudinal reinforcement zone that is not located directly adjacent to a longitudinal edge of the board, wherein the at least one third longitudinal reinforcement zone comprises a longitudinal centre region and a longitudinal cutting zone, the longitudinal cutting zone is arranged in that longitudinal centre region of the at least one third longitudinal reinforcement zone. Thus, the longitudinal centre region comprises a longitudinal cutting zone that does not contain the reinforcement material and that is located between two longitudinal reinforcement subzones of the at least one third longitudinal reinforcement zone such that the longitudinal cutting zone has the same distance to both longitudinal edges of the at least one third longitudinal reinforcement zone. In this case, the reinforcement material may be present in a constant (relatively high) concentration over the whole centre region except in the longitudinal cutting zone in which the reinforcement material is not present. The longitudinal cutting zone has a width that is smaller than the width of the longitudinal centre region. In this context, the width is the extent in the transversal direction of the board. As already explained above, the presence of the longitudinal cutting zone simplifies the cutting of the board into panels since the board can be cut in the longitudinal subzone that does not comprise the reinforcement material.

A further preferred embodiment of the board according to the invention is characterized in that
- the at least one longitudinal reinforcement zone has a distance from the top surface and/or the bottom surface of the board of at least 5 mm, preferably of at least 10 mm, more preferably of at least 20 mm, most preferably of at least 30 mm, or
- the at least one longitudinal reinforcement zone extends substantially over the whole thickness of the board.

When the at least one longitudinal reinforcement zone extends substantially over the whole thickness of the board, a good and homogeneous distribution of the reinforcement material is achieved. Thus, the mechanical stability of the edges of the panels produced from the board by cutting the board along the longitudinal reinforcement zones is increased. The thickness of the board is the extent of the board in the direction that is perpendicular to the longitudinal direction of the board and that is perpendicular to the transversal direction of the board.

Furthermore, it is preferred that the board according to the invention is a chipboard, an oriented strand board, a medium-density fibre board, or a high-density fibre board.

Moreover, it is preferred that the board according to the invention has at least one upper layer, wherein the at least one upper layer is preferably selected from the group consisting of primer layers, décor layers, polymer layers, lacquer layers, sound insulation layers, moisture protection layers, wear resistant layers, backing layers, and combinations thereof.

The present invention also relates to a method of producing a spreading material mat, the method comprising the following steps:
a) Providing particulate material comprising or consisting of particulate wooden material,
b) Producing glued particulate material by applying an adhesive to the particulate material,
c) Forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector,
wherein a reinforcement material is applied to the spread glued particulate material parallel to the conveying direction
   during forming the spreading material mat and/or
   after forming the spreading material mat and before any pressing of the spreading material mat
such that the spreading material mat has at least one longitudinal reinforcement zone containing the reinforcement material.

The application of the reinforcement material is accomplished by spraying, sputtering and/or injecting the reinforcement material onto and/or into the spread glued particulate material.

The present invention also relates to a spreading material mat producible by the method according to the present invention, the spreading material mat having a top surface and having a bottom surface, and the spreading material mat having a longitudinal direction and having a transversal direction, wherein the spreading material mat comprises at least one longitudinal reinforcement zone containing a reinforcement material.

The spreading material mat according to the invention is producible or produced by the method according to the invention, i.e. the method of producing a spreading material mat.

The present invention also relates to a method of producing panels, the method comprising the features of the method according to the invention of producing at least one board for production of panels, characterized in that, the board is cut or sawn at least once in the longitudinal direction of the board and at least once in the transversal direction of the board into a plurality of panels, wherein, by cutting or sawing the board in its longitudinal direction, the board is cut or sawn in the at least one longitudinal reinforcement zone such that each of the resulting panels comprises at least one reinforced edge.

Thus, the method of producing panels at least comprises the steps:
a) Providing particulate material comprising or consisting of particulate wooden material,
b) Producing glued particulate material by applying an adhesive to the particulate material,
c) Forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector, d) Producing a board by pressing the spreading material mat during conveying on the conveyor, wherein a reinforcement material is applied to the spread glued particulate material parallel to the conveying direction
during forming the spreading material mat and/or
after forming the spreading material mat and before any pressing of the spreading material mat such that the spreading material mat has at least one longitudinal reinforcement zone containing the reinforcement material, and wherein the board produced in step d) is cut or sawn at least once in the longitudinal direction of the board and at least once in the transversal direction of the board into a plurality of panels, wherein, by cutting or sawing the board in its longitudinal direction, the board is cut or sawn in the at least one longitudinal reinforcement zone such that each of the resulting panels comprises at least one reinforced edge.

Since the reinforcement material is applied to the spread glued particulate material
during forming the spreading material mat, and/or
after forming the spreading material mat and before any pressing of the spreading material mat, the reinforcement material is distributed better and more homogeneously in the reinforcement zone. Thus, the at least one reinforced edge of the produced panels can withstand higher mechanical loading. Furthermore, a precise appliance of the reinforcement material is possible, i.e. it is possible to homogeneously distribute the reinforcement material in precisely defined regions of the spread glued particulate material. Following this, it is possible with the method according to the present invention to obtain panels with one or more precisely defined reinforced zones at their edges in which the reinforcement substance is homogeneously distributed. Moreover, using overpressure or vacuum for distributing the already applied reinforcement material is not necessary in the method according to the present invention, which makes this method less complex than known methods of the state of the art. Furthermore, in the method according to the present invention, an additional pre-compression step for pre-compressing (or pre-pressing) the spreading material mat is not necessary. Thus, one complete method step compared with the methods known in the state of the art can be saved. Therefore, the method according to the present invention is more cost-effective, more time-saving and less complex. Since the reinforcement material is not applied over the whole width of the spreading material mat but only within one or more reinforcement zones, only a low amount of reinforcement material is needed and, thus, the method according to the invention is more cost-effective than other methods known from the state of the art. Since the reinforcement material is applied parallel to the conveying direction within one or more longitudinal reinforcement zones, it is possible to easily conduct the appliance of the reinforcement material while the spread glued particulate material is conveyed on the conveyer. Thus, the appliance of the reinforcement material can be easily integrated in a completely continuous process for producing the panels. Therefore, the method according to the invention is time-saving. Following this, the method according to the invention is a cost-effective and time-saving method for the production of panels with reinforced edges, wherein these reinforced edges have an increased mechanical stability.

All preferred features and embodiments described for the method according to the invention of producing at least one board for production of panels also rely to the method according to the invention of producing panels.

Preferably, the board is cut or sawn in the at least one longitudinal reinforcement zone such that each of the resulting panels comprises at least two reinforced edges.

It is particularly preferred that the board is cut or sawn in the at least one longitudinal reinforcement zone such that the at least one longitudinal reinforcement zone is halved.

Furthermore, it is preferred that the at least one reinforced edge is at least one longitudinal reinforced edge.

Preferably, the cutting or sawing takes place while the board is conveyed on a conveyor.

In a further preferred embodiment of the method for producing panels according to the invention, a locking profile element is machined, preferably pressed or milled, to the at least one reinforced edge of each panel, wherein the locking profile element is preferably selected from the group consisting of tongues, lips, hooks, grooves, and combinations thereof. Edges of panels that exhibit a locking profile element are especially susceptible to fracture. Thus, it is very advantageous that a panel edge exhibiting a locking profile element is produced as a reinforced edge according to the method of the invention, since thus the locking profile element has a significantly higher mechanical stability.

Preferably, the reinforcement material is selectively applied in predefined locations of the spread glued particulate material in which future locking profile elements are arranged. Thus, it is possible to adapt the shape or form of the longitudinal reinforcement zone to the shape or form of the future locking profile element such that the reinforced zones at the edges of the panels are perfectly fitted to the locking profile elements of the panels.

A further preferred embodiment of the method for producing panels according to the invention is characterized in that the board additionally has at least one transversal reinforcement zone wherein, by cutting or sawing the board in its transversal direction, the board is cut or sawn in the at least one transversal reinforcement zone. Consequently, with this preferred embodiment, panels with at least one reinforced longitudinal edge and at least one reinforced transversal edge and also panels with three or four reinforced edges can be produced.

It is particularly preferred that the board is cut or sawn in the at least one transversal reinforcement zone such that the at least one transversal reinforcement zone is halved.

The present invention also relates to a panel producible or produced by the method according to the invention, the panel having two longitudinal edges and two transversal edges, wherein, along at least one of the longitudinal edges and/or along at least one of the transversal edges, a reinforcement zone containing a reinforcement material is arranged, such that the panel comprises at least one reinforced edge. Thus, at least one of the two longitudinal edges of the panel is a reinforced edge and/or at least one of the two transversal edges of the panel is a reinforced edge.

It is preferred that, along at least one of the longitudinal edges of the panel, a reinforcement zone containing a reinforcement material is arranged, such that the panel comprises at least one reinforced longitudinal edge. In this case, at least one of the two longitudinal edges of the panel is a reinforced edge.

The panel according to the invention is producible or produced by the method according to the invention, i.e. the method of producing panels.

A further preferred embodiment of the panel according to the invention is characterized in that, along each of the longitudinal edges and/or along each of the transversal edges, a reinforcement zone containing a reinforcement material is arranged. Thus, both longitudinal edges of the panel are reinforced edges containing a reinforcement material and/or both transversal edges of the panel are reinforced edges containing a reinforcement material.

It is particularly preferred that, along each of the longitudinal edges of the panel, a reinforcement zone containing a reinforcement material is arranged. In this case, both longitudinal edges of the panel are reinforced edges.

In a further preferred embodiment of the panel according to the invention, the reinforcement zone
- has a distance from the top surface and/or the bottom surface of the panel of at least 5 mm, preferably of at least 10 mm, more preferably of at least 20 mm, most preferably of at least 30 mm, or
- extends substantially over the whole thickness of the panel.

Furthermore, it is preferred that the panel according to the invention is a chip panel, an oriented strand panel, a medium-density fibre panel, or a high-density fibre panel.

Moreover, it is preferred that the panel according to the invention has at least one upper layer, wherein the at least one upper layer is preferably selected from the group consisting of primer layers, décor layers, polymer layers, lacquer layers, sound insulation layers, moisture protection layers, wear resistant layers, backing layers, and combinations thereof.

In a further preferred embodiment of the panel according to the invention, the at least one reinforced edge has a locking profile element, wherein the locking profile element is preferably selected from the group consisting of tongues, lips, hooks, grooves, and combinations thereof. Edges of panels that exhibit a locking profile element are especially susceptible to fracture. Thus, it is very advantageous that a panel edge exhibiting a locking profile element is a reinforced edge, since thus the locking profile element has a significantly higher mechanical stability.

The present invention also relates to the use of a panel according to the invention as floor panel, wall panel, and/or ceiling panel.

The present invention also relates to an apparatus for producing at least one board for production of panels, the apparatus comprising
- a gluing device for applying an adhesive to a particulate material which comprises or consists of particulate wooden material and thus producing glued particulate material,
- a conveyor on which the glued particulate material can be conveyed in a conveying direction,
- a spreading head for homogeneously spreading the glued particulate material onto the conveyor within a spreading sector such that a spreading material mat having a longitudinal direction parallel to the conveying direction and having a transversal direction perpendicular to the longitudinal direction of the spreading material mat can be formed on the conveyer and the spread glued particulate material is accumulated to the spreading material mat in conveying direction over the length of the spreading sector, at least one continuous belt press for producing a board by pressing the spreading material mat, and
- at least one reinforcement material addition means for applying a reinforcement material to the spread glued particulate material
  - during forming the spreading material mat and/or
  - after forming the spreading material mat and before any pressing of the spreading material mat such that the spreading material mat has at least one longitudinal reinforcement zone containing the reinforcement material.

A preferred embodiment of the apparatus according to the invention is characterized in that the at least one reinforcement material addition means is suitable for continuously applying the reinforcement material to the spread glued particulate material, wherein the at least one reinforcement material addition means is preferably at least one nozzle and/or at least one injection needle assembly with injection needles.

Preferably, the at least one reinforcement material addition means is at least one nozzle and/or at least one injection needle assembly with injection needles.

In a further preferred embodiment of the apparatus according to the invention the apparatus comprises a plurality of reinforcement material addition means, wherein the reinforcement material addition means are arranged above the conveyor within the spreading sector such that, for each longitudinal reinforcement zone, the reinforcement material can be applied to the spread glued particulate material by at least two reinforcement material addition means, preferably by at least three reinforcement material addition means, more preferably by 3 to 10 reinforcement material addition means.

In a further preferred embodiment, the reinforcement material addition means are arranged such that at least three longitudinal reinforcement zones can be obtained that are arranged equidistantly to each other.

It is preferred that all reinforcement material addition means for one longitudinal reinforcement zone are arranged on one hypothetical line. For example, these hypothetical lines can be arranged equidistantly to each other. Thus, it can be achieved that the longitudinal reinforcement zones are arranged equidistantly to each other.

A further preferred embodiment of the apparatus according to the invention is characterized in that the spreading sector is divided into a plurality of subsectors arranged successively in conveying direction, wherein
- the at least one reinforcement material addition means is located only in one of the subsectors, or
- in each of the subsectors, at least one reinforcement material addition means is located.

By locating at least one reinforcement material addition means in each of the successively arranged subsectors, it is achieved that the reinforcement material is present in various depths of the spreading material mat. Thus, it can be achieved that the at least one longitudinal reinforcement zone extends substantially over the whole thickness of the spreading material mat.

By locating the at least one reinforcement material addition means only in one of the subsectors, it can be achieved that the reinforcement material is present only in one specific depth or in one specific depth range of the spreading material mat. Thus, it may also be achieved that the at least one longitudinal reinforcement zone has a specific distance from the top surface and/or the bottom surface of the spreading material mat, e.g. a distance of at least 10 mm, preferably of at least 20 mm, more preferably of at least 40 mm, most preferably of at least 60 mm.

A further preferred embodiment of the apparatus according to the invention is characterized in that the apparatus comprises a device for cutting or sawing the board in the transversal direction of the board into a plurality of boards.

In a further preferred embodiment of the apparatus according to the invention, the apparatus comprises a device for providing the board with at least one upper layer, wherein the device for providing the board with at least one upper layer is preferably selected from the group consisting of printing devices, coating devices, spraying devices, sputtering devices, and combinations thereof.

The present invention also relates to an apparatus for producing panels comprising the features of the apparatus according to the invention for producing at least one board for production of panels, characterized in that the apparatus comprises at least one device for cutting or sawing the board in its longitudinal direction, preferably a longitudinally aligned saw, and/or at least one device for cutting or sawing the board in its transversal direction, preferably a diagonal saw.

Thus the apparatus for producing panels at least comprises
a gluing device for applying an adhesive to a particulate material which comprises or consists of particulate wooden material and thus producing glued particulate material,
a conveyor on which the glued particulate material can be conveyed in a conveying direction,
a spreading head for homogeneously spreading the glued particulate material onto the conveyor within a spreading sector such that a spreading material mat having a longitudinal direction parallel to the conveying direction and having a transversal direction perpendicular to the longitudinal direction of the spreading material mat can be formed on the conveyer and the spread glued particulate material is accumulated to the spreading material mat in conveying direction over the length of the spreading sector,
at least one continuous belt press for producing a board by pressing the spreading material mat,
at least one reinforcement material addition means for applying a reinforcement material to the spread glued particulate material
during forming the spreading material mat and/or
after forming the spreading material mat and before any pressing of the spreading material mat
such that the spreading material mat has at least one longitudinal reinforcement zone containing the reinforcement material, and
at least one device for cutting or sawing the board in its longitudinal direction, preferably a longitudinally aligned saw, and/or at least one device for cutting or sawing the board in its transversal direction, preferably a diagonal saw.

All preferred features and embodiments described for the apparatus according to the invention for producing at least one board for production of panels also rely to the apparatus according to the invention for producing panels.

In a preferred embodiment, the apparatus is characterized in that the at least one device for cutting or sawing the board in its longitudinal direction is arranged and configured such that the board is cut or sawn in the at least one longitudinal reinforcement zone.

A further preferred embodiment is characterized in that the apparatus comprises a device for machining a locking profile element to at least one reinforced edge of each panel, wherein the device for machining a locking profile element is preferably a miller.

The present invention is explained in more detail with reference to the subsequent figures and preferred embodiments without restricting the invention to the specific parameters represented there.

FIG. 1 shows a perspective view of a specific embodiment of a panel 1 according to the invention. The panel 1 has two longitudinal edges 2, 2' (long side edges) and two transversal edges 3, 3' (short side edges). Along each of the longitudinal edges 2, 2', a reinforcement zone 6, 6' containing a reinforcement material is arranged such that both longitudinal edges 2, 2' are reinforced edges. The first longitudinal edge 2 has a hook shaped profile as a second locking profile element 5 which fits into a corresponding first locking profile element 4 that is located at the second longitudinal edge 2'. Both locking profile elements 4, 5 are located in the reinforcement zones 6, 6'. While the reinforcement zones 6, 6' are drawn along sharp lines in FIG. 1, it is emphasized that, in preferred embodiments, there is a preferably gradual transition from the non-reinforced zones to the reinforcement zones 6, 6' in order to avoid abrupt changes in mechanical properties, which again would result in zones that tend to easily break along such abrupt transitions.

Figure 2:
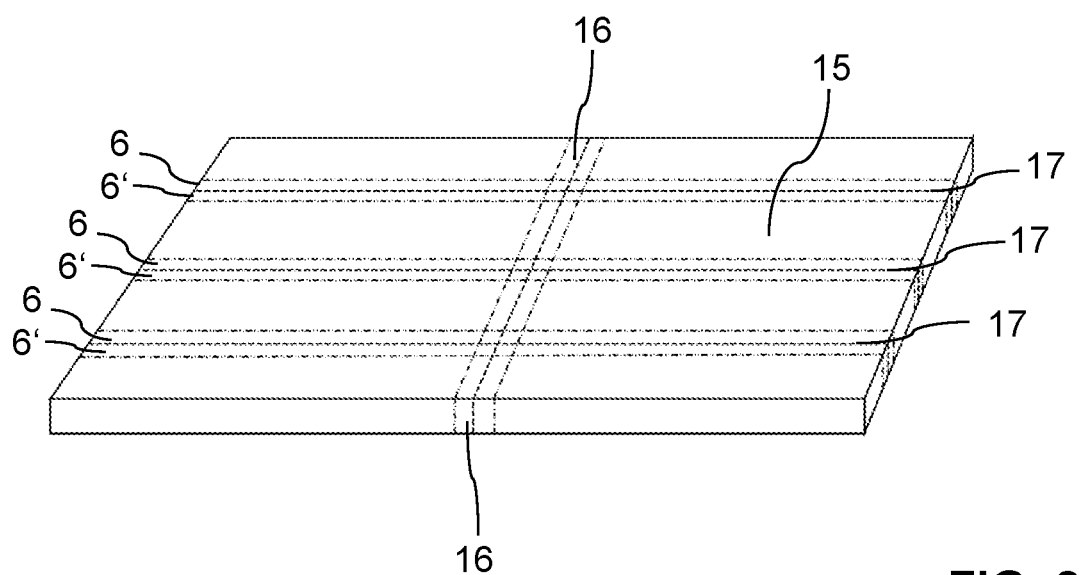
FIG. 2 shows a perspective view of a specific embodiment of a board 15 according to the present invention.

FIG. 2 shows a perspective view of a specific embodiment of a board 15 according to the invention. In the course of the manufacturing of the panels according to the present invention, the panels are usually cut from a board 15 which is considerably larger than the final panels. The board 15 is usually produced in a continuous belt press 14 such as in an MDF production process and thus can have an "endless" length. For this reason, the board 15 is normally cut transversally 16 and longitudinally 17 in order to produce panels of the desired final size. In subsequent production steps, connection means in the form of locking profile elements 4, 5 are formed or milled at the thereby produced longitudinal edges 2, 2' of the panels 1. Since such locking profile elements usually contain parts which are stressed with high mechanical loads, it is advantageous to provide reinforcement zones 6, 6' along the longitudinal edges 2, 2'. In FIG. 2, it can be seen that the board 15 is cut longitudinally 17 in each of the longitudinal reinforcement zones 6, 6' such that each longitudinal reinforcement zone 6, 6' is halved. The resulting halves are located on different panels while each of the halves is an own reinforcement zone 6, 6' of the corresponding panel.

Figure 3:
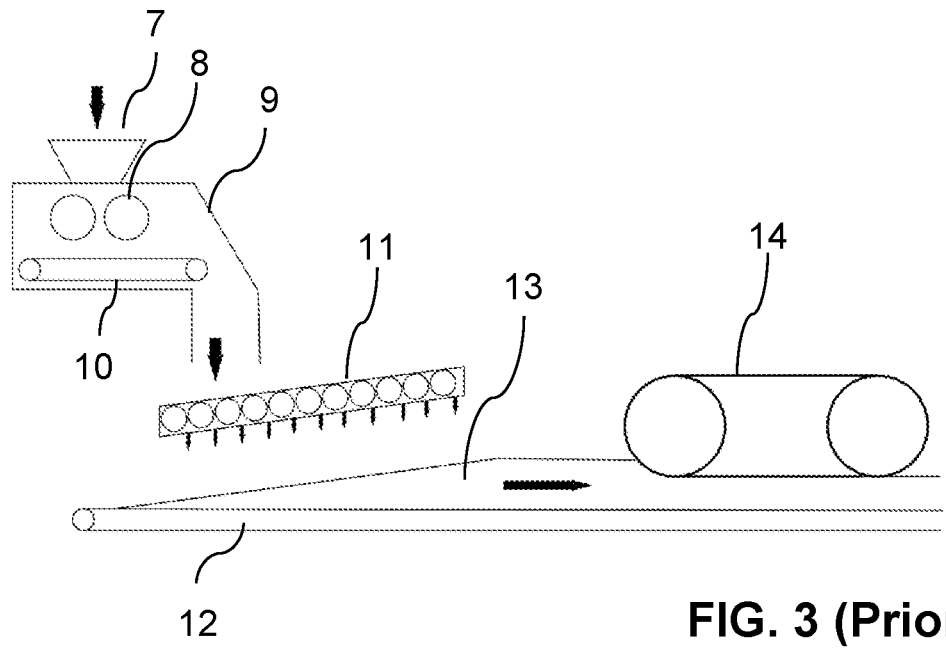
FIG. 3 shows a simplified side view of a spreading process as known in the art.

FIG. 3 shows a simplified side view of an example of a board manufacturing process as known in the art. Specifically, it shows a spreading and pressing process for MDF/HDF fiber boards. In this example, preglued wood fibers are passed through a chute 7 onto breaking rollers 8 for a first even distribution onto a metering conveyor 10. The thereby metered and distributed fibers subsequently leave the spreading material bunker 9 to fall onto a spreading head 11. Such a spreading head 11 may consist of e.g. vibrating screens or a series of rotating distribution drums and has the objective to lay a homogeneous spreading material mat 13 onto a conveyor 12 over the length of a spreading sector that starts at the beginning of the spreading head 11 and ends at the end of the spreading head 11. The homogeneous spreading material mat 13 is then usually passed to a variety of optional steps such as further homogenization of the mat 13 or pre-pressing and is then passed to a press, which usually is in the form of a continuous band press 14 in which the initially porous material is both compacted and in which the glue is cured at normally elevated temperatures and elevated pressures.

Figure 4:
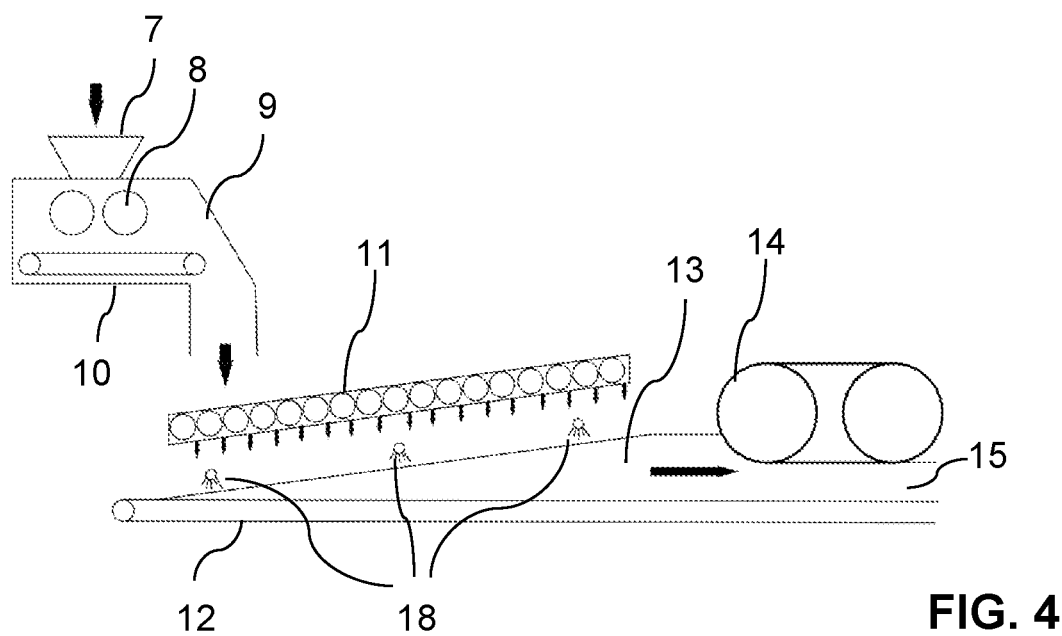
FIG. 4 shows a simplified side view of a specific embodiment of the method of producing a board for production of panels according to the present invention and a specific embodiment of the apparatus for producing at least one board for production of panels according to the invention.

FIG. 4 shows a simplified side view of a specific embodiment of the method and the apparatus for producing a board according to the invention. In comparison to the method and the device shown in FIG. 3, an additional reinforcement step and reinforcement means according to the present invention has been added. For this reinforcement step, reinforcement material is applied to the spread glued particulate material parallel to the conveying direction during forming the spreading material mat 13. Afterwards, the spreading material mat 13 enters the press 14. The reinforcement is achieved by spraying a preferably liquid reinforcement material through a series of reinforcement material addition means 18 (e.g. nozzles) that are located above the conveyor into predefined zones that correspond to the reinforcement zones 6, 6' of the produced spreading material mat 13. The device shown in FIG. 4 comprises three reinforcement material addition means 18 that are arranged successively in conveying direction, wherein one reinforcement material addition means 18 is located at the start of the spreading sector, one reinforcement material addition means 18 is located in the middle of the spreading sector, and one reinforcement material addition means 18 is located at the end of the spreading sector. In other words, the spreading sector is divided into three subsectors arranged successively in conveying direction, wherein, in each of the subsectors, at least one reinforcement material addition means is located. In this context, the spreading sector is the region where the glued particulate material is spread onto the conveyor. Thus, the spreading sector starts at the beginning of the spreading head 11 and ends at the end of the spreading head 11.

Figure 5:
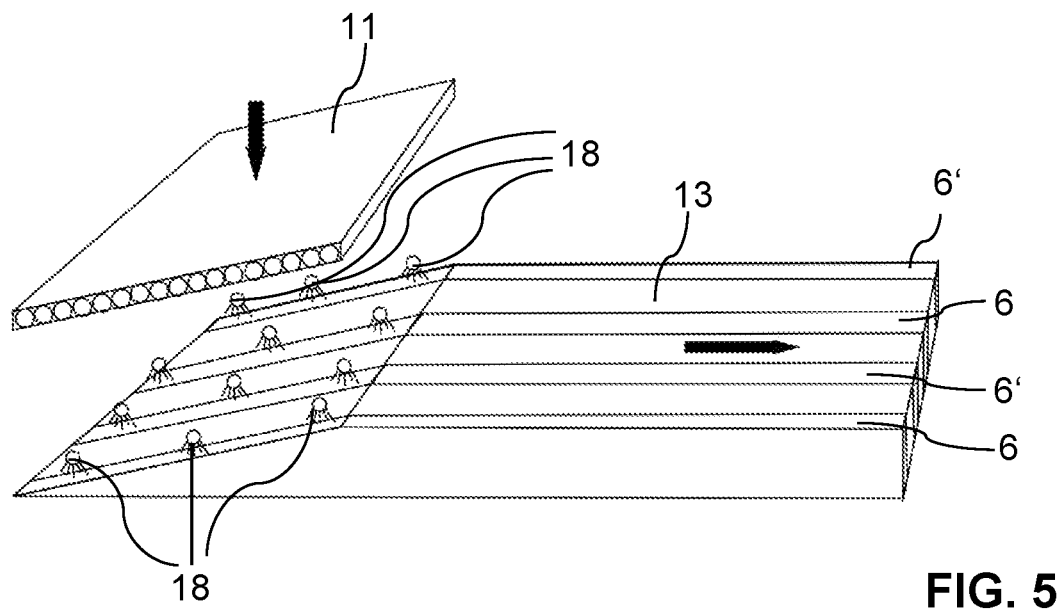
FIG. 5 shows a simplified perspective view of a further specific embodiment of the method of producing a board for production of panels according to the present invention and a specific embodiment of the apparatus for producing at least one board for production of panels according to the invention.

FIG. 5 shows a simplified perspective view of a further specific embodiment of the method and the apparatus for producing a board according to the invention. In comparison to the embodiment shown in FIG. 4, the device comprises twelve reinforcement material addition means 18 that are arranged in a specific pattern. In detail, the reinforcement material addition means 18 are arranged above the conveyor 12 within the spreading sector such that, for each longitudinal reinforcement zone 6, the reinforcement material can be applied to the spread glued particulate material by three reinforcement material addition means 18.

FIG. 5 also shows that the reinforcement zones 6 are mainly created as longitudinal equidistant parallel bars in the porous spreading material mat 13, before the spreading material mat 13 enters the press 14 (not shown in FIG. 5). During the pressing process, these reinforcement zones will be compressed vertically, but will maintain their longitudinal position on the conveyor 12.

Figure 6:
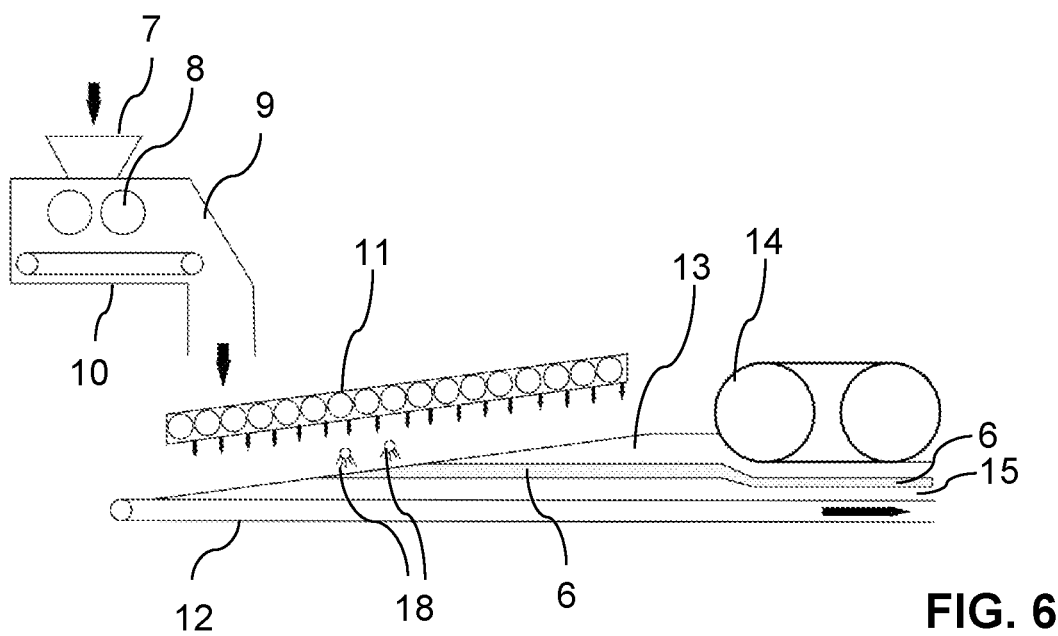
FIG. 6 shows a simplified side view of a further specific embodiment of the method of producing a board for production of panels according to the present invention and a further specific embodiment of the apparatus for producing at least one board for production of panels according to the invention.

FIG. 6 shows a simplified perspective view of a further specific embodiment of the method and the apparatus for producing a board according to the invention. In comparison to the embodiment shown in FIG. 4, the device shown in FIG. 6 comprises two reinforcement material addition means 18 that are arranged successively in conveying direction, wherein both reinforcement material addition means 18 are located in the middle of the spreading sector. In other words, the spreading sector is divided into three subsectors arranged successively in conveying direction, wherein both reinforcement material addition means 18 are located only in the second one of the subsectors.

It arises from FIG. 6, that such arrangement of the reinforcement material addition means results in that the longitudinal reinforcement zone 6 is arranged at a specific depth of the obtained spreading material mat 13 and the obtained board 15 and, thus, has a distance from the top surface and/or the bottom surface of the obtained spreading material mat 13 and the obtained board 15.

Figure 7:
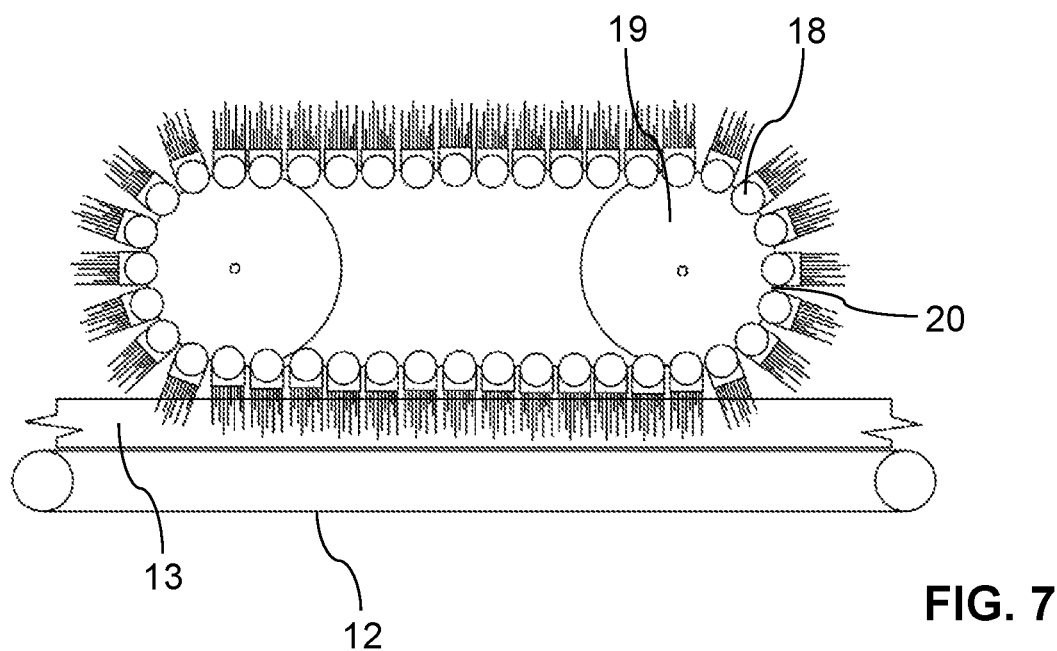
FIG. 7 shows a simplified schematic view of a further specific embodinvent of the method of producing a board for production of panels according to the present invention and a further specific embodiment of the apparatus for producing at least one board for production of panels according to the invention.

FIG. 7 shows a simplified side view of a further specific embodiment of the method and the apparatus for producing a board according to the invention. In this embodiment, injection needle assemblies with injection needles are used as reinforcement addition means 18. Thus, the reinforcement material is applied to the spread glued particulate material by several injection needle assemblies with injection needles after forming the spreading material mat 13 and before any pressing of the spreading material mat 13. The injection needle assemblies are mounted onto an injection needle carousel 19. Such an injection needle carousel 19 may be realized in the form of two rotating carousel bands 20, one at each of the two edges of the conveyor 12. Onto these rotating carousel bands 20 several reinforcement material addition means 18 in the form of injection needle assemblies are mounted such that the injection needle assemblies are arranged along the rotating carousel bands. By rotating the carousel bands 20, these injection needle assemblies are moved synchronously and at the same speed with the spreading material mat 13 and rotate around the injection needle carousel 19 while the injection needles penetrate into the spreading material mat 13 such that the reinforcement material can be injected into the spreading material mat 13. With this specific embodiment, the reinforcement material can be easily applied over the whole thickness of reinforcement zone also after forming the spreading material mat. Thus, an even more homogeneous distribution of the reinforcement material within the reinforcement zones can be achieved, which results in a higher mechanical stability of the reinforcement zones of the produced board, and thus also higher mechanical stability of the reinforced edges of the panels produced from such board.

Figure 8:
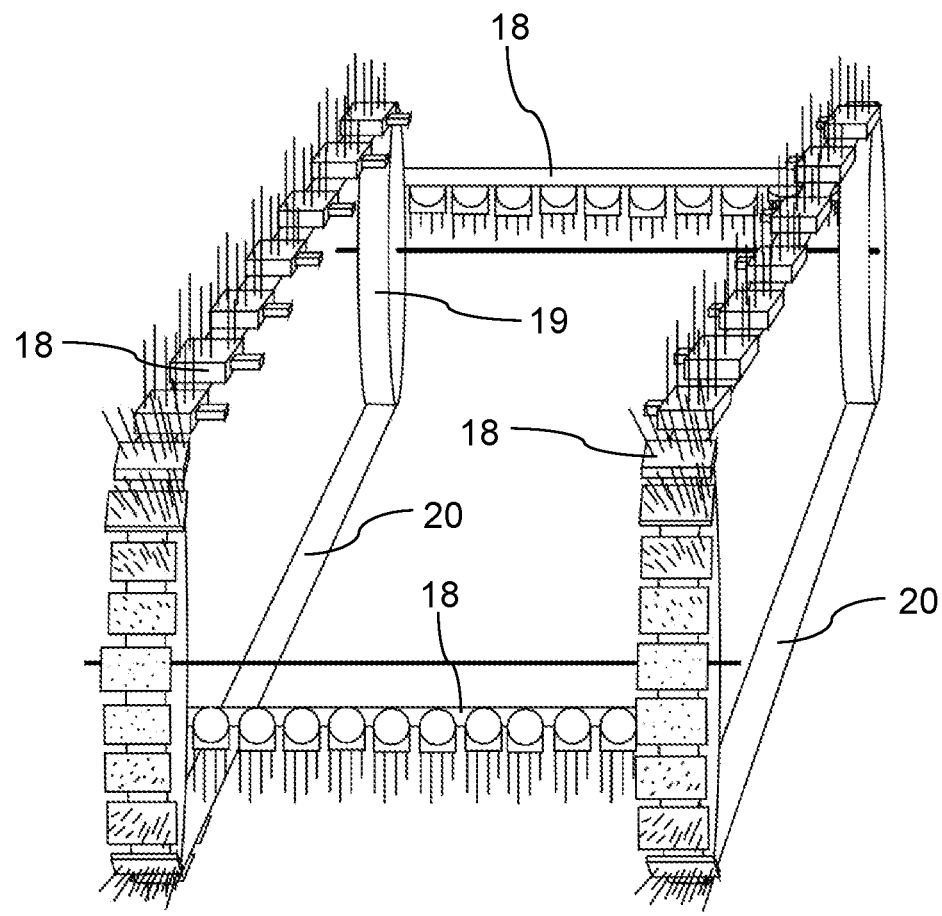
FIG. 8 shows a simplified schematic view of a further specific embodiment of the method of producing a board for production of panels according to the present invention and a further specific embodiment of the apparatus for producing at least one board for production of panels according to the invention.

FIG. 8 shows a simplified schematic view of a further specific embodinvent of the method and the apparatus for producing a board according to the invention. This embodiment is based on the embodiment shown in FIG. 7. Also in this case, injection needle assemblies with injection needles are used as reinforcement addition means 18. The injection needle assemblies are mounted onto an injection needle carousel 19 that is realized in the form of two rotating carousel bands 20, one at each of the two edges of the conveyor 12 (not shown in FIG. 8). Onto these rotating carousel bands 20 several reinforcement material addition means 18 in the form of injection needle assemblies are mounted.

Furthermore, the apparatus shown in FIG. 8 comprises several injection needle assemblies arranged in the general form of two bars that are mounted onto and arranged between the rotating carousel bands 20. These generally bar-formed injection needle assemblies can be moved on the injection needle carousel 19 synchronously and at the same speed with the spreading material mat 13 (not shown in FIG. 8) horizontally, while the injection needles penetrate the spreading material mat 13 vertically. By this synchronous horizontal movement of the injection needles and an additionally corresponding vertical, non rotary movement of the injection needles, a clean and purely vertical injection path if the injection needles is achieved, and the spreading material mat 13 is only minimally perturbed. Since these bar-formed injection needle assemblies are arranged such that they are parallel to in the transversal direction of the spreading material mat, the reinforcement material is additionally applied to the spread glued particulate material perpendicular to the conveying direction such that the spreading material mat 13 additionally has at least one transversal reinforcement zone comprising the reinforcement material.

To clarify the use of and to hereby provide notice to the public, the phrases "at least one of <A>, <B>, ... and <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, or N including any one element alone or the one element in combination with one or more of the other elements which may also include, in combination, additional elements not listed. Unless otherwise indicated or the context suggests otherwise, as used herein, "a" or "an" means "at least one" or "one or more."

LIST OF REFERENCE SIGNS 1, 1', 1": Panel
2, 2': Longitudinal edges (long side edges)
3, 3': Transversal edges (short side edges)
4: First locking profile element
5: Second locking profile element
6, 6': Reinforcement zone
7: Chute
8: Breaking rollers
9: Spreading material bunker
10: Metering conveyor
11: Spreading head
12: Conveyor
13: Spreading material mat
14: Continuous belt press
15: Board (after press)
16: Transversal cut
17: Longitudinal cut
18: Reinforcement material addition means
19: Injection needle carousel
20: Carousel band

The invention claimed is:

1. A method comprising:
 providing particulate material comprising or consisting of particulate wooden material;
 producing glued particulate material by applying an adhesive to the particulate material;
 forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector; and
 producing a board by pressing the spreading material mat, wherein a reinforcement material is applied to the spread glued particulate material parallel to the conveying direction by spraying, sputtering, and/or injecting
 during forming the spreading material mat and/or
 after forming the spreading material mat and before any pressing of the spreading material mat such that the spreading material mat has at least one longitudinal reinforcement zone containing the reinforcement material.

2. The method of claim 1 wherein the reinforcement material is applied to the spread glued particulate material parallel to the conveying direction
 during forming the spreading material mat and/or
 after forming the spreading material mat and before any pressing of the spreading material mat such that the spreading material mat has a plurality of longitudinal reinforcement zones that are arranged equidistant to each other.

3. The method of claim 2 wherein a first longitudinal reinforcement zone of the plurality of longitudinal reinforcement zones is located directly adjacent to a first longitudinal edge of the spreading material mat, a second longitudinal reinforcement zone of the plurality of longitudinal reinforcement zones is located directly adjacent to a second longitudinal edge of the spreading material mat, and at least one third longitudinal reinforcement zone of the plurality of longitudinal reinforcement zones is located between the first longitudinal reinforcement zone and the second longitudinal reinforcement zone.

4. The method of claim 3 wherein the extent of the first longitudinal reinforcement zone in the transversal direction of the spreading material mat is equal to the extent of the second longitudinal reinforcement zone in the transversal direction of the spreading material mat, wherein the extent of the at least one third longitudinal reinforcement zone in the transversal direction of the spreading material mat is twice as large as the extent of the first longitudinal reinforcement zone in the transversal direction of the spreading material mat.

5. The method of claim 3 wherein the extent of the first longitudinal reinforcement zone in the transversal direction of the spreading material mat is from 3 mm to 70 mm, and/or the extent of the second longitudinal reinforcement zone in the transversal direction of the spreading material mat is from 3 mm to 70 mm, and/or the extent of the at least one third longitudinal reinforcement zone in the transversal direction of the spreading material mat is from 6 mm to 140 mm.

6. The method of claim 3 wherein the at least one third longitudinal reinforcement zone has two longitudinal edges that are parallel to the longitudinal direction of the spreading material mat, wherein the at least one third longitudinal reinforcement zone comprises two longitudinal reinforcement subzones containing the reinforcement material and one longitudinal cutting zone that does not contain the reinforcement material and that is located between the two longitudinal reinforcement subzones such that the one longitudinal cutting zone has the same distance to both longitudinal edges of the at least one third longitudinal reinforcement zone.

7. The method of claim 1 wherein the at least one longitudinal reinforcement zone has two longitudinal edges that are parallel to the longitudinal direction of the spreading material mat and comprises a longitudinal centre region that is parallel to the longitudinal direction of the spreading material mat, wherein the concentration of the reinforcement material decreases gradually from the longitudinal centre region to one or both of the two longitudinal edges of the at least one reinforcement zone.

8. The method of claim 1 wherein
 the at least one longitudinal reinforcement zone has a distance from the top surface and/or the bottom surface of the spreading material mat of at least 10 mm, or
 the at least one longitudinal reinforcement zone extends substantially over the whole thickness of the spreading material mat.

9. The method of claim 1 wherein the reinforcement material is continuously applied to the spread glued particulate material.

10. The method of claim 1 wherein, for each longitudinal reinforcement zone, the reinforcement material is applied to the spread glued particulate material by at least one reinforcement material addition means that is located above the conveyor within the spreading sector, wherein the at least one reinforcement material addition means is at least one nozzle and/or at least one injection needle assembly with injection needles.

11. The method of claim 1 wherein, for each longitudinal reinforcement zone, the reinforcement material is applied to the spread glued particulate material by a plurality of reinforcement material addition means, that are located above the conveyor within the spreading sector, wherein the reinforcement material addition means are arranged equidistant to each other.

12. The method of claim 1 wherein, additionally, the reinforcement material is applied to the spread glued particulate material perpendicular to the conveying direction by spraying, sputtering, and/or injecting
during forming the spreading material mat and/or
after forming the spreading material mat and before any pressing of the spreading material mat such that the spreading material mat additionally has at least one transversal reinforcement zone comprising the reinforcement material.

13. The method of claim 1 wherein the adhesive and the reinforcement material are the same material, wherein the adhesive and/or the reinforcement material is selected from the group consisting of urea formaldehyde resins, resorcinol formaldehyde resins, phenol formaldehyde resins, polyurethane resins, epoxy resins, cyanoacrylates, polyvinyl acetates, methylene diphenyl diisocyanate resins, and mixtures thereof.

14. The method of claim 1 wherein the particulate wooden material is selected from the group consisting of wood fibres, wood dust, wood strands, wood chips, and mixtures thereof.

15. The method of claim 1 wherein the board is cut or sawn at least once in the transversal direction of the board into a plurality of boards.

16. The method of claim 15 wherein each of boards of the plurality of boards is provided with at least one upper layer, wherein the at least one upper layer is selected from the group consisting of primer layers, décor layers, polymer layers, lacquer layers, sound insulation layers, moisture protection layers, wear resistant layers, backing layers, and combinations thereof.

17. The method of claim 1 wherein the board has a plurality of longitudinal reinforcement zones.

18. The method of claim 17 wherein a first longitudinal reinforcement zone of the plurality of longitudinal reinforcement zones is located directly adjacent to a first longitudinal edge of the board, a second longitudinal reinforcement zone of the plurality of longitudinal reinforcement zones is located directly adjacent to a second longitudinal edge of the board, and at least one third longitudinal reinforcement zone of the plurality of longitudinal reinforcement zones is located between the first longitudinal reinforcement zone and the second longitudinal reinforcement zone.

19. A method of producing a spreading material mat, the method comprising:
providing particulate material comprising or consisting of particulate wooden material,
producing glued particulate material by applying an adhesive to the particulate material,
forming a spreading material mat having a longitudinal direction and having a transversal direction perpendicular to the longitudinal direction by homogeneously spreading the glued particulate material onto a conveyor on which the spread glued particulate material is conveyed in a conveying direction that is parallel to the longitudinal direction of the spreading material mat, wherein the glued particulate material is spread onto the conveyor over a length of a spreading sector extending in conveying direction such that, in conveying direction, the spread glued particulate material is accumulated to the spreading material mat over the length of the spreading sector,
wherein a reinforcement material is applied to the spread glued particulate material parallel to the conveying direction by spraying, sputtering, and/or injecting
during forming the spreading material mat and/or
after forming the spreading material mat and before any pressing of the spreading material mat such that the spreading material mat has at least one longitudinal reinforcement zone containing the reinforcement material.

20. An apparatus for producing at least one board for production of panels, the apparatus comprising
a gluing device for applying an adhesive to a particulate material which comprises or consists of particulate wooden material and thus producing glued particulate material,
a conveyor on which the glued particulate material can be conveyed in a conveying direction,
a spreading head for homogeneously spreading the glued particulate material onto the conveyor within a spreading sector such that a spreading material mat having a longitudinal direction parallel to the conveying direction and having a transversal direction perpendicular to the longitudinal direction of the spreading material mat can be formed on the conveyer and the spread glued particulate material is accumulated to the spreading material mat in conveying direction over the length of the spreading sector,
at least one continuous belt press for producing a board by pressing the spreading material mat, and
at least one reinforcement material addition means for applying a reinforcement material to the spread glued particulate material
during forming the spreading material mat and/or
after forming the spreading material mat and before any pressing of the spreading material mat such that the spreading material mat has at least one longitudinal reinforcement zone.

\* \* \* \* \*